May 8, 1973 J. J. SVARZ 3,732,193
THIN FILM PROCESS FOR POLYMERIZATION OF WATER SOLUBLE MONOMERS
Filed April 28, 1971
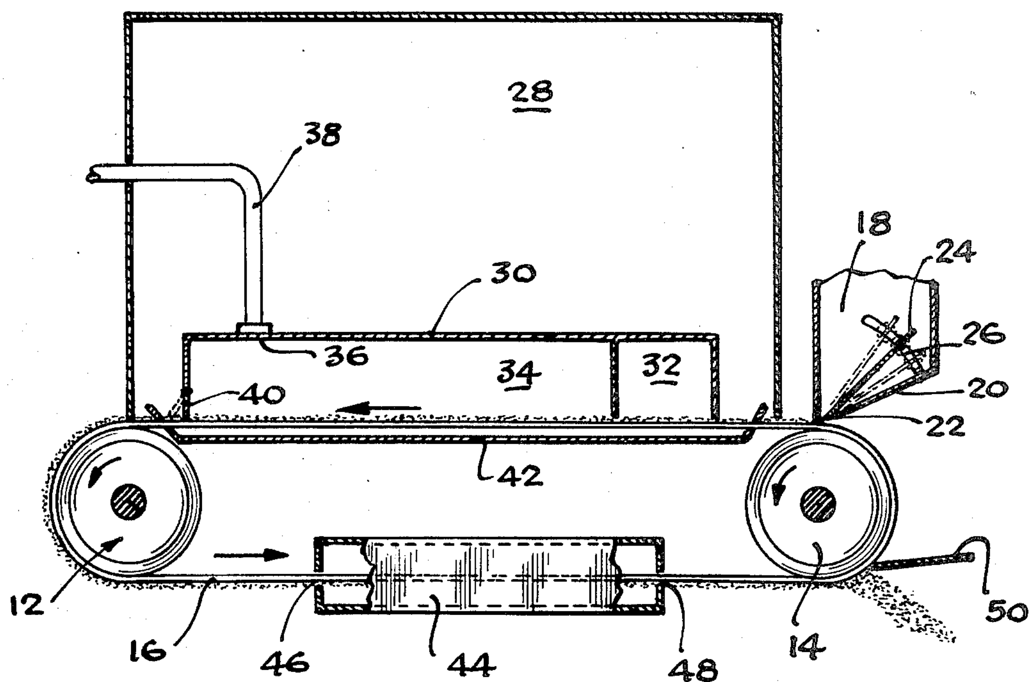
Inventor
Jerry J. Svarz
By John G. Premo
Attorney United States Patent Office 3,732,193

Patented May 8, 1973

3,732,193

THIN FILM PROCESS FOR POLYMERIZATION OF WATER SOLUBLE MONOMERS

Jerry J. Svarz, La Grange, Ill., assignor to Nalco Chemical Company

Filed Apr. 28, 1971, Ser. No. 138,027
Int. Cl. C08f *3/90, 15/02, 1/00*
U.S. Cl. 260—79.3 MU 5 Claims

ABSTRACT OF THE DISCLOSURE

A continuous polymerization process, in which an aqueous solution of a water soluble unsaturated monomer is polymerized on a heated continuously moving belt, gives polymeric products in a dry thin film form.

A common method for polymerizing water-soluble unsaturated monomers resides in polymerizing aqueous solutions thereof under appropriate reaction conditions. The aqueous solution polymerization of such monomers as acrylamide, acrylic acid and the like has certain disadvantages. In addition to being a batch-type process, these prior art polymer solutions are only capable of producing dilute polymer solutions. For instance, when high molecular weight acrylamide polymers are produced in solution become extremely viscous at low concentrations; hence, the amount of starting monomer that can be used in the process is limited.

Since only dilute polymer solutions are produced by solution polymerization techniques, it is customary to treat these solutions to precipitate the finished polymer therefrom. The precipitated polymers are collected and dried. The thus dried products are to be used in industrial applications and require redissolution in water.

If it were possible to produce concentrated polymers by a solution polymerization technique which was rapid and readily produced polymers in a solid, readily dissolvable form, an advance to the art would be afforded. Also of benefit would be a method for using solution polymerization techniques to continuously produce water-soluble vinyl polymers.

OBJECTS

It is an object of this invention to provide a continuous process for polymerizing water soluble vinyl monomers.

A further object is to provide a method for polymerizing water-soluble vinyl monomers which produce finished polymers in a concentrated form.

Further objects will be evident to those skilled in the art.

The invention comprises a continuous thin film polymerization method for making polymers and copolymers of water-soluble ethylenic-unsaturated monomers which method comprises the steps of:

(a) Casting an aqueous monomer solution in the presence of a free radical initiator upon a continuous belt apparatus to form a thin film;

(b) Passing the thin film through a heated reaction tunnel having an inert gas blanket to polymerize the aqueous monomer in the form of a thin film;

(c) Drying the thin film polymer; and (d) Recovering the thin film polymer as a polymerized product.

In commercial use, a uniform thin film of monomer is cast upon the surface of a continuous belt. An adjustable knife with settings is advantageously used in that it can compensate for the interrelated factors of feed viscosity, desired film thickness, and belt speed.

Some of the important factors involved in the reaction process include the film temperature exotherm during the reaction, the removal of $O_2$ from the reaction chamber, and evaporation losses from the film prior to the initiation of the reaction.

In accordance with this invention, all known water-soluble unsaturated monomers can be polymerized by the thin film continuous belt process. Such monomers include, but are not restricted to acrylamide, methacrylamide, acrylic acid, methacrylic acid, vinylbenzyl trimethylammonium chloride, alkali metal and ammonium salts of 2-sulfoethylacrylate, 1-aminoethyl methacrylate hydrochloride, alkali metal and ammonium salts of vinylbenzyl sulfonate, etc., or any mixtures thereof. Aqueous solutions of the monomers to be polymerized can be varied widely in monomer content. Generally, between 5 and 50 percent by weight aqueous solutions of monomer are used, depending upon the monomer and system used.

Free radical yielding initiators are used in the polymerization process. Both organic and inorganic type compounds are acceptable for use in this invention. Azo type compounds are used advantageously in the polymerizations, the most preferred being 2,2′-azobis (isobutyronitrile) and azobis ($\alpha,\alpha$-dimethylvalenonitrile) in amounts between 0.001 and 5.0 percent by weight of monomer. Initiators such as potassium persulfate and benzoyl peroxides are used as well as redox systems, the most preferred being potassium persulfate and ammonium bisulfite. Generally, the amounts of these free radical initiators range between 0.001 and 10.0 percent by weight of monomer.

THE DRAWING

For a better understanding of the invention, reference may be had to the drawing which gives a schematic view of the apparatus used in the practice of the invention.

With specific reference to the drawing there is shown two spaced apart rotating drums 12 and 14. Positioned about the drums is and in frictional driving engagement therewith is a flexible continuous belt 16 which may be constructed of any flexible yet solid material such as stainless steel, plastic or the like. Positioned near the top of drum 14 is supply tank 18 which is adapted to contain aqueous solutions of water-soluble vinyl monomers. The bottom 20 of supply tank 18 is fitted with a slotted feed opening 22 which extends substantially the width of belt 16. The aperture of the slotted feed opening may be adjusted by means of doctor blade 24 which is accurately adjusted by means of an appropriate slot locking device 26.

Positioned over the top of the continuous belt 16 is an oven 28 which supplies heat to a reaction tunnel 30. The reaction tunnel is fitted over the moving surface of the belt and is divided into two zones. The first zone 32 is a preheat zone which heats the polymer solution furnished from supply tank 18 to at about reaction temperature. The second zone in the reaction tunnel 30 is a reaction zone 34 wherein the polymerization of the aqueous monomer solution takes place on the continuous moving belt 16.

The reaction zone 34 is fitted with an inlet 36 which receives from supply conduit 38 an inert gas, such as nitrogen, from a supply source not shown. The exit end of the reaction zone 34 is fitted with a pivotally-mounted sealing flap 40.

Positioned below the continuous belt 16 in the general area of the reaction tunnel is trough 42 which is adapted to contain a cooling fluid such as water. Located at the lower portion of the belt 16 is a drying oven 44 having an inlet opening 46 and an outlet 48.

Positioned near the bottom of drum 14 is a scraper 50 which is adapted to remove the dried polymer film from the continuous belt 16.

In operation the drums 12 and 14 rotate in a counter-clockwise direction to move the continuous belt 16 in the direction indicated by the arrows. Monomers solution is fed to the belt from the supply tank 18 through slotted feed opening 22.

The film forms on the belt 16 and enters preheat zone 32 which pre-warms the film to reaction temperature. This heating step also tends to minimize evaporative losses. Typical warmup time is about one minute.

The thin film of monomer solution then passes into reaction zone 34 where most of the oxygen is removed from the solution due to the blanket of inert gas which is supplied through opening 36. As the continuous belt 16 is passing through reaction zone 34 the bottom surface of the continuous belt rests on meniscus of fluid such as water contained in trough 42. This allows a more uniform temperature control of the polymerizing monomer solution contained on the continuous belt 16. While passing through the reaction zone 34 the monomer solution undergoes polymerization. The polymerized solution passes through the sealing flap 40, is conveyed around drum 12 and enters the drying oven 44 through inlet 46. As the dried film leaves the drying oven through outlet 48 it contacts scraper 50 where the solid polymer film formed is removed to produce a flake-like product which is collected in a receiving means not shown.

The reaction temperature is dependent upon other physical variables of the system. Generally, the preferred heating chamber tunnel temperature range is from 150° F.–500° F. The preferred water bath temperature range is from 150° F.–210° F. The preferred drying oven temperature range is from 150° F.–500° F. Within such heating chamber and water bath temperature ranges, conversion reaches almost 100% completion in from one minute to ten minutes, depending upon monomer and catalyst concentration and other reaction variables such as film thickness and degree of nitrogen purge. Generally for polymerization the film temperature should range from 130° F. to 250° F.

Heat is dissipated through the bottom film surface by conduction and the top film surface by evaporation of water. Thus, reaction temperature can be controlled at or near the initiation temperature.

The thickness of the monomer film cast upon the surface of the continuous belt is of critical importance. The most advantageous film thickness range is between 0.001–0.25 inch. The preferred range is from 0.001–0.01 inch. A film thickness in excess of the claimed limited results in extremely high heat release resulting in unacceptable product. In addition experimentation shows that the charging time of the polymerized film is proportional to the square of its thickness. In a preferred embodiment of this invention, a monomer thickener is added to increase the viscosity of the film.

Release agents are used to improve the releasability of the dry product from the surface of the belt. Of such agents the soap and fatty substances and their salts are advantageously used. A preferred release agent is the acetate derivative of a fatty amine salt such as cocoa amine acetate. The release agent is preferably from 0.001 to 1.0% by weight of the monomer solution.

Following is a description by way of example of methods of carrying the invention into effect.

For the purpose of the examples described below, all experiments were performed on a continuous belt having the following dimensions:

| | | |
|---|---|---|
| Belt length | feet | 30 |
| Belt width | do | 1.5 |
| Heating chamber length | do | 15 |
| Pre-heat tunnel length | foot | 1 |
| Inert atmosphere tunnel length | feet | 10 |
| Water bath length | do | 10 |
| Belt speed | feet/minute | 2 |
| Heating chamber temp. | ° F. | 250 |
| Bath temp. | ° F. | 170 |
| Drying oven temp. | ° F. | 275 |

EXAMPLE I

Preparation of polyacrylamide—Recipe

| | G. |
|---|---|
| 30 percent acrylamide solution in water | 1000 |
| Ammonium persulfate | 3.0 |
| Cocoa amine acetate | 0.05 |

To the acrylamide solution was added the cocoa amine acetate and the ammonium persulfate. This monomer mixture was stirred for five minutes. The monomer solution was cast upon the surface of the continuous belt. The thickness of the cast film was 0.01 inch. Nitrogen was passed through the nitrogen atmosphere tunnel for 10 minutes previous to casting at a flow rate of 30 cu. ft./hr. Temperature probes positioned on the surface of the belt indicated that the film temperature was 165° F. upon entrance into the reaction chamber. The temperature of the film did not exceed 167° F. at any point during the reaction. The thin film which exited from the drying oven was quite brittle and popped cleanly off of the belt. The polymer has a moisture content of 6 percent by weight. The polymer was ground and dissolved in solution within 15 minutes. The Brookfield solution viscosity of a 1.0 percent aqueous solution of the polymer was 175 cps.

EXAMPLE II

Preparation of polyacrylamide—Recipe

| | G. |
|---|---|
| 30 percent acrylamide solution in water | 2000 |
| 2,2'-azobis (isobutyronitrile) | 6.0 |
| Cocoa amine acetate | 0.10 |

The solutions were prepared and mixed as in Example I. The resulting mixture was cast upon the continuous belt; the thickness being 0.01 inch. Nitrogen was passed through the nitrogen atmosphere tunnel for 10 minutes previous to casting at a flow rate of 30 cu. ft./hr. Temperature probes positioned on the surface of the belt indicated that the film temperature was 168° F. upon entrance into the reaction chamber. The temperature of the film did not exceed 171° F. at any point during the reaction. As in Example I, the thin film which exited from the drying ovens released quite easily from the surface of the belt. The polymer has a moisture content of 7.0 percent by weight. The polymer was ground and dissolved in solution within 15 minutes. The Brookfield solution viscosity of a 1.0 percent aqueous solution of the polymer was 210 cps.

EXAMPLE III

Preparation of polyacrylamide-acrylic acid copolymer—Recipe

| | G. |
|---|---|
| 30 percent acrylamide solution in water | 1000 |
| Acrylic acid | 130 |
| 2,2' azobis (isobutyronitrile) | 4.3 |
| Cocoa amine acetate | 0.57 |

The acrylamide was dissolved in water. To this acrylamide solution was added the acrylic acid and the cocoa amine. The pH of this solution was adjusted to 8.5 with 50% sodium hydroxide. The reaction tunnel was thoroughly purged with nitrogen gas. The monomer solution was thoroughly mixed and cast upon the surface of the continuous belt. The thickness of the cast film was 0.007 inch. Temperature probes positioned on the surface of the belt indicated that the film temperature was 169° upon entrance into the reaction chamber. The temperature of the film did not exceed 169° F. at any point during the reaction. The thin film product had excellent release characteristics. The moisture content of the product was 8 percent by weight. The ground polymer dissolved in solution within 15 minutes and the Brookfield solution viscosity of a 0.5 percent aqueous solution of the polymer was 9000 cps.

EXAMPLE IV

Preparation of polyacrylamide-methacrylic acid copolymer—Recipe

| | G. |
|---|---|
| 30 percent acrylamide | 2000 |
| Methacrylic acid | 46.0 |
| 2,2′ azobis (isobutyronitrile) | 6.4 |
| Cocoa amine acetate | 1.01 |

The reactants were combined and mixed in the same way as in Example III, with methacrylic acid substituted for acrylic acid.

The film temperature was 165° F. at the entrance into the reaction chamber and did not exceed 168° F. at any point during the reaction. The film thickness was 0.012 inch.

The moisture content of the product was 7 percent by weight. The dried product dissolved readily and had a Brookfield solution viscosity of 1600 cps. for a 1.0 percent aqueous solution.

EXAMPLE V

Preparation of polyacrylamide-diethylaminoethyl methacrylate—Recipe

| | G. |
|---|---|
| 30 percent acrylamide | 2000 |
| DMAEM (dimethylaminoethylmethacrylate) | 200 |
| 2,2′ azobis (isobutyronitrile) | 8.0 |
| Cocoa amine acetate | 1.10 |

This procedure was similar to that of Example III, with the exception of DMAEM being substituted for acrylic acid. The pH was also adjusted to 5.0 with concentrated hydrochloric acid.

The moisture content of the dried product was 9 percent and the Brookfield viscosity was 1000 cps. for a 1.0 percent aqueous solution.

The invention is hereby claimed:

1. A continuous thin film polymerization method for making polymers and copolymers of water soluble ethylenic-unsaturated monomers which method comprises the steps of:

(A) casting an aqueous monomer solution having a monomer concentration of from 5 to 50% by weight, in the presence of from 0.001 to 5.0% by weight a free radical initiator selected from the group consisting of 2,2′ azobis(isobutyronitrile), azobis(α,α-dimethylvalenonitrile), potassium persulfate, benzoyl peroxide, and ammonium bisulfite, or mixtures thereof, upon a continuous belt apparatus to form a thin film having a thickness from 0.01 to 0.25 inch, wherein the monomer is selected from the group consisting of acrylamide, methacrylamide, acrylic acid, methacrylic acid, vinylbenzyl trimethylammonium chloride, alkali metal and ammonium salts of 2-sulfoethylacrylate, 1-aminoethyl methacrylate hydrochloride, alkali metal and ammonium salts of vinyl benzyl sulfonate, or any mixtures thereof;

(B) passing the thin film through a heated reaction tunnel having a temperature range from 150 to 500° F. having an inert gas blanket wherein the reaction tunnel has an oxygen concentration of less than 1000 p.p.m. to polymerize the aqueous monomer in the form of a thin film;

(C) drying the thin film polymer at a temperature of from 150 to 500° F.; and (D) recovering the thin film polymer as a polymerized product.

2. A method as claimed in claim 1 wherein the monomer is polymerized at a film temperature of between 130° F. and 250° F.

3. A method of claim 1 wherein the monomer solution contains a release agent.

4. A method of claim 3 wherein the release agent is cocoa amine acetate.

5. A method of claim 3 wherein the release agent concentration is between 0.001 and 1.0 weight percent of the monomer solution.

References Cited

UNITED STATES PATENTS

| | | | |
|---|---|---|---|
| 3,573,263 | 3/1971 | Gill | 260—79.3 |
| 3,058,958 | 10/1962 | Glavis | 260—80.3 N |

JAMES A. SEIDLECK, Primary Examiner

C. A. HENDERSON, Jr., Assistant Examiner

U.S. Cl. X.R.

260—23 R, 80 M, 80.3 N, 86.1 N, 89.5 N, 89.7 R, 89.7 N